Jan. 8, 1924.
R. A. WILLSON
LIQUID ATOMIZER
Filed Oct. 18, 1921
1,480,324
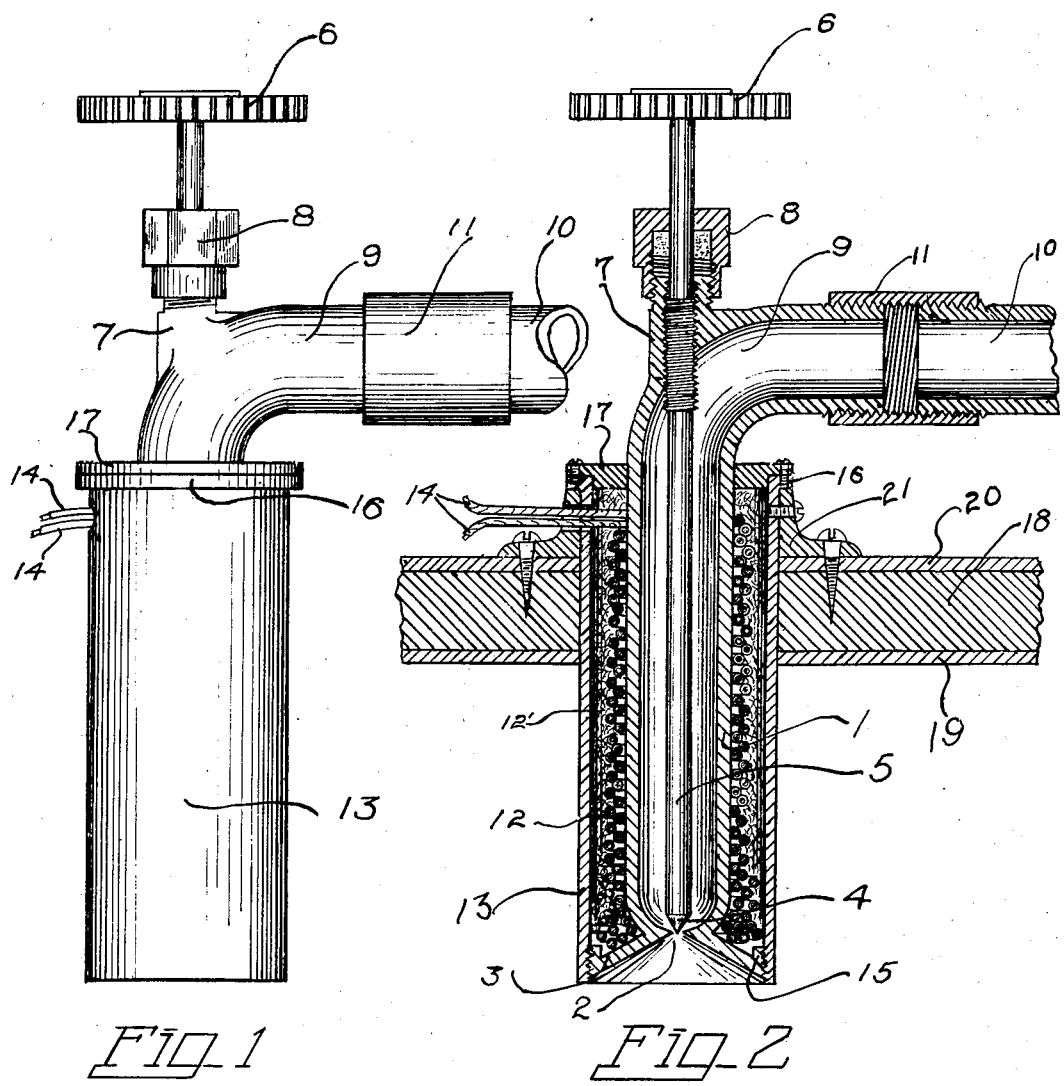
Inventor
Russell A. Willson
By Herbert E. Smith
Attorney Patented Jan. 8, 1924.

1,480,324

UNITED STATES PATENT OFFICE.

RUSSELL A. WILLSON, OF SPOKANE, WASHINGTON, ASSIGNOR OF ONE-HALF TO FRED N. MARTIN, OF SPOKANE, WASHINGTON.

LIQUID ATOMIZER.

Application filed October 18, 1921. Serial No. 508,568.

*To all whom it may concern:*

Be it known that I, RUSSELL A. WILLSON, a citizen of the United States, residing at Spokane, in Spokane County and State of Washington, have invented certain new and useful Improvements in Liquid Atomizers, of which the following is a specification.

My present invention relates to improvements in liquid atomizers designed especially for use in connection with refrigerating apparatus where it is necessary to heat the atomizer. In a co-pending application for patent on the process and apparatus for making ice cream, filed October 11, 1921, Ser. No. 507,004, I illustrate and describe an apparatus wherein the liquid to be congealed or frozen is atomized by the utilization of a number of spray nozzles, located within the freezing chamber. To prevent freezing of the liquid within the nozzles I have found it desirable that the nozzles be heated in such manner as to maintain the liquid, within the nozzle, and before it is sprayed into the refrigeration chamber, at a suitable temperature to insure the free flow of the liquid through the nozzle. The heating of the nozzle and the liquid therein thus prevents freezing of the liquid in the nozzle with consequent stopping of the flow of liquid through the nozzle.

In the accompanying drawings I have illustrated one complete example of the physical embodiment of my invention wherein the parts are combined and arranged according to the best mode I have thus far devised for the practical application of the principles of my invention.

Figure 1 is a view in side elevation of a liquid atomizer constructed according to my invention and embodying therewith an electric heating attachment.

Figure 2 is a sectional view through the device of Fig. 1.

In the preferred form of the invention as depicted in the drawings, the L-shaped nozzle 1 has a restricted opening 2 and a flaring head 3, and the end 4 of the stem 5, forms a needle valve for co-action with the opening 2 that forms a seat for the valve. The stem is provided with a hand wheel 6 and is threaded in the boss 7, while a stuffing box 8 is provided to prevent leakage of the liquid from the nozzle.

The short branch or arm 9 of the nozzle of the atomizer is connected to the supply pipe 10 by a coupling 11, and it will be understood that the liquid to be sprayed or atomized from the mouth 2 of the nozzle flows through the pipe 10 and nozzle 1. This flow may be by gravity, or the liquid may be forced through the nozzle by suitable pressure, as by air pressure, and the atomization or spray may be governed by turning the handle wheel 6 of the stem 5 in usual manner.

An external heater is provided for the nozzle, and the heater preferably is made up of electric resistance wires 12 wound around the nozzle, with suitable insulation indicated at 12' in Fig. 2, and encased within a casing 13. The casing as shown is preferably a cylinder having open ends, and the lead wires 14 for the electric heating element pass out through an opening provided therefor in the wall of the casing.

At its lower end the casing is threaded on the exteriorly threaded flange 15 on the flaring head 3 of the nozzle, and at its upper end the casing has a flange 16 to which the disk 17, forming a closure or head for the casing, is affixed as by screws.

The nozzle is illustrated as supported in a horizontal wall 18 having lining plates as 19 and 20, and this wall may be the top or ceiling of the refrigerating chamber of the refrigerating apparatus with which the nozzle is to be used.

By means of a collar 21 fixed to the upper plate 20, the nozzle, which is passed through an opening in the ceiling of the chamber, or supporting element, is suspended in proper position as shown in Fig. 2.

The flaring head 3 in conjunction with the needle valve 4 is designed to spray and distribute the atomized liquid as it passes from the nozzle, in order that the atoms may be suspended in the refrigerated atmosphere of the chamber in which the nozzle projects. The currents of electricity passing through the heating medium of coil 12, it will readily be apparent, will maintain the enclosed nozzle at the desired or required temperature to permit free flow of the liquid therethrough, notwithstanding the fact that the nozzle is located in the refrigerating chamber. Inasmuch as the temperature of the atmosphere in which the nozzle is located is below the freezing point, it will be apparent that the liquid in the nozzle, if the latter were unprotected, would freeze and close the valve opening 2. By the utilization of the electric heating medium around the nozzle and within the casing the nozzle is heated as required, but no material loss of heat is experienced because of the presence of the casing and insulating material enclosed by the casing, and of course the temperature of the freezing or refrigerating chamber is not materially affected.

From the above description taken in connection with my drawings it is apparent that I have provided a device of this character which is instrumental in the efficient operation of the atomizer in performing its required functions under the described conditions, and insures a comparatively perfect instrumentality for obtaining the desired results.

Having thus fully described my invention what I claim as new and desire to secure by Letters Patent is—

The combination with an enclosure wall of an atomizer including a nozzle having a restricted end opening and outwardly flaring head, an external attaching flange on said head, a casing secured to said flange and forming a space around the nozzle, an electric heating element within said space, an insulating medium between said element and casing, and a head closing the opposite open end of said casing.

In testimony whereof I affix my signature.

RUSSELL A. WILLSON.